Feb. 24, 1942.                C. A. ARENS                2,274,288
                          CONTROL MECHANISM
                        Filed June 15, 1938          2 Sheets-Sheet 1
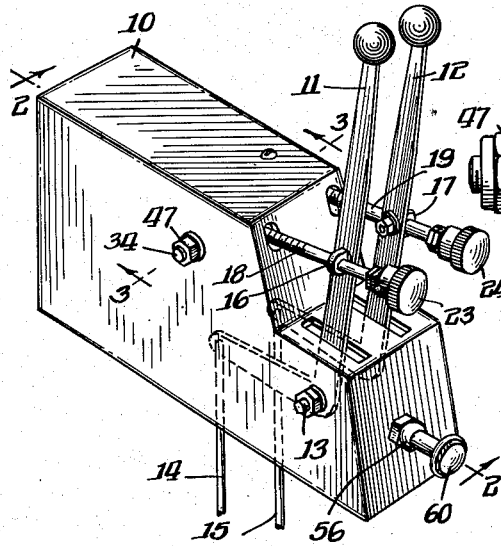
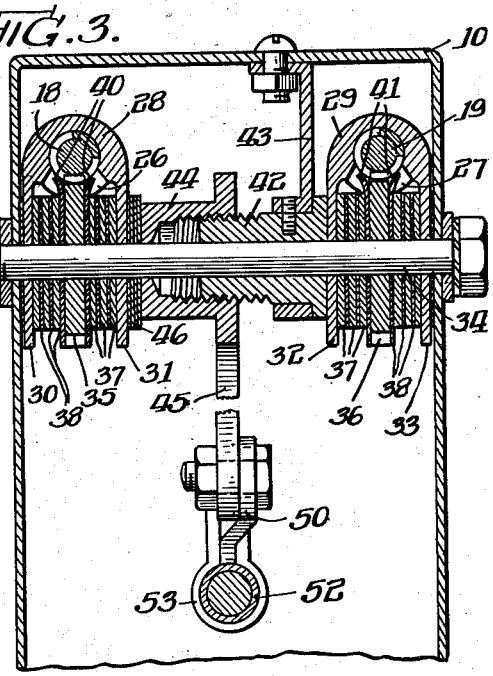
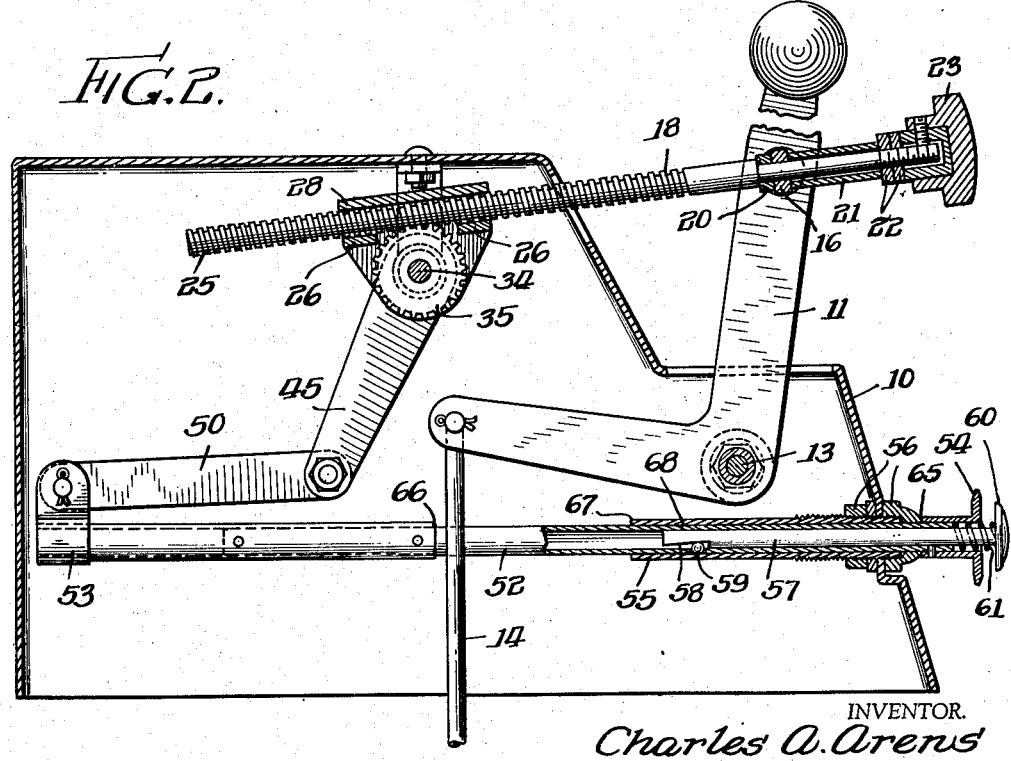
INVENTOR.
Charles A. Arens
BY Cox & Moore
ATTORNEYS.

Feb. 24, 1942.     C. A. ARENS     2,274,288
CONTROL MECHANISM
Filed June 15, 1938     2 Sheets-Sheet 2
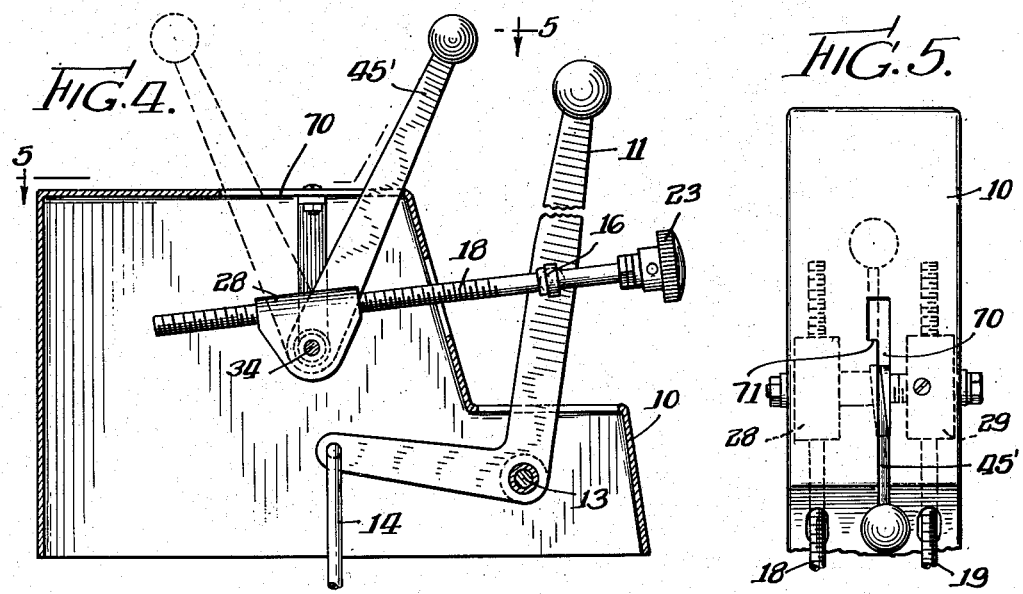
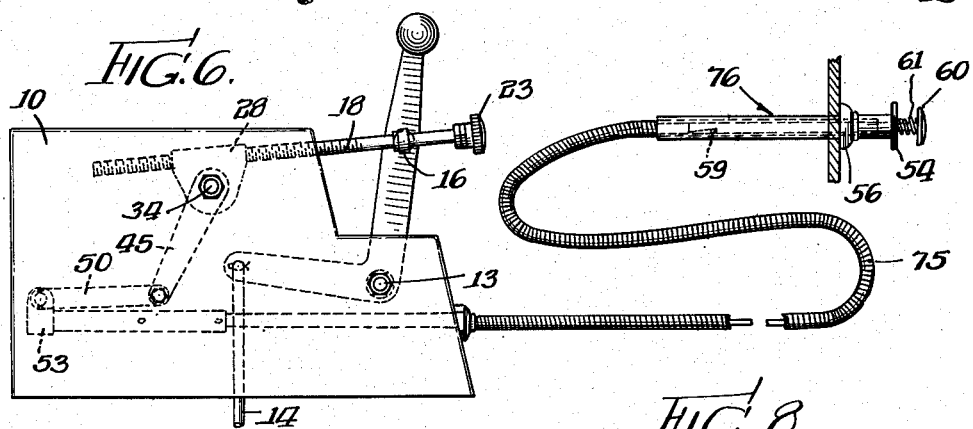
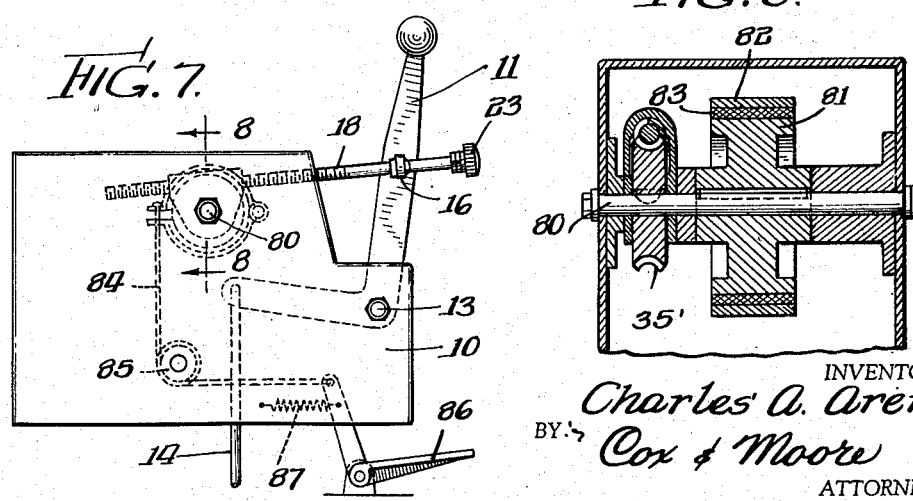
INVENTOR.
Charles A. Arens
BY Cox & Moore
ATTORNEYS.

Patented Feb. 24, 1942

2,274,288

UNITED STATES PATENT OFFICE 2,274,288

CONTROL MECHANISM

Charles A. Arens, Chicago, Ill., assignor to Arens Controls, Inc., Chicago, Ill., a corporation of Illinois Application June 15, 1938, Serial No. 213,785

10 Claims. (Cl. 74—491)

This invention relates to control mechanisms, and particularly to control mechanisms of the type adapted to impart either rapid or micrometer adjustments to the devices to be controlled.

It is an object of the invention to provide a control mechanism of improved construction and reliability, and having improved operating characteristics. More specifically it is an object of the invention to provide a control mechanism which can be readily and rapidly moved to any desired position within a given range of adjustment, with little or no resistance to movement, and which can be locked in the desired position of adjustment against inadvertent or unauthorized movements while permitting micrometer adjustments from such position.

Further objects of the invention are to provide a control mechanism of the type stated wherein any desired degree of locking resistance may be imparted to the mechanism to hold it in adjusted position, from a positive locking action to a light frictional resistance; wherein the locking resistance may be imparted from a remote point; wherein the locking resistance may be imparted from a separately operated device thus leaving the hand of the operator free for manipulation of the control mechanism; and wherein means is provided to prevent "crawling" or other unauthorized movement of the micrometer adjustment means even when the control mechanism is subjected to extreme conditions of vibration.

Still other objects and advantages of the invention will be apparent from the following specification when taken in connection with the accompanying drawings, wherein certain preferred embodiments of the invention are illustrated.

In the drawings, wherein like reference numerals refer to like parts throughout:

Fig. 1 is a perspective view of a control mechanism constructed in accordance with one form of the invention.

Fig. 2 is a longitudinal sectional view of the control mechanism shown in Fig. 1, on the line 2—2 thereof.

Fig. 3 is a transverse sectional view on the line 3—3 of Fig. 1.

Fig. 4 is a sectional view of a modified form of control mechanism.

Fig. 5 is a top view of the mechanism shown in Fig. 4.

Fig. 6 illustrates another form of control mechanism wherein the locking means may be operated from a remote point.

Fig. 7 shows a still further embodiment incorporating a treadle operated mechanism, and Fig. 8 is a sectional view of the mechanism shown in Fig. 7 on the line 8—8 thereof.

This application is a continuation-in-part of my copending applications Serial No. 728,853, filed June 4, 1934, now issued as Patent No. 2,132,919, dated October 11, 1938, and Serial No. 91,037, filed July 17, 1936, now issued as Patent No. 2,161,661, dated June 6, 1939.

Referring first to Figs. 1, 2 and 3 of the drawings, the embodiment of the invention set forth therein for purposes of illustration comprises a housing 10 carrying a pair of bell crank control levers 11 and 12 on a pivot 13. The levers 11 and 12 are connected to wires or rods 14 and 15 adapted to be connected in any suitable manner to the devices to be controlled. While two levers have been illustrated, it is to be understood that the control mechanism may incorporate but one control lever, or it may have three or more levers, as may be desired. The control levers 11 and 12 carry eye-bolts 16 and 17 in which a pair of control shafts 18 and 19, one for each of the control levers, are journaled. The eye-bolts are pivotally mounted in the control levers, and the control shafts are in turn journaled in the eye-bolts so as to be rotatable with respect thereto, but constrained against relative longitudinal movement. In other words, the control shafts may be freely rotated within the eye-bolts, but if the control levers are pivotally moved about the axis 13, corresponding longitudinal movement will be imparted to the control shafts, or if the control shafts are moved longitudinally corresponding movement will be imparted to the levers.

Any suitable mounting may be employed for journaling the control shafts within the eye-bolts, one suitable means being illustrated in Fig. 2 comprising a collar 20 and a sleeve 21 adapted to embrace the eye-bolt and secured against longitudinal displacement on the control shaft by a pair of lock nuts 22. The control shafts carry knobs 23 and 24 at their ends, which are manually operable to impart rotational movements to the control shafts.

The control shafts are screw threaded on their inner ends for threaded engagement with bearings 26 and 27 (Fig. 3) formed in the upper portions of a pair of yoke members 28 and 29, one yoke member being provided for each control shaft. The yoke member 28 is provided with a pair of downwardly projecting ears or sides 30 and 31, and the yoke member 29 is provided with similar sides or ears 32 and 33, by means of which the yokes are pivotally mounted upon a bolt 34 extending through and carried by the housing 10.

A pair of gears 35 and 36, also pivotally mounted on the bolt 34, are in toothed or geared engagement with the screw threads of the control shafts, and four sets of friction assemblies each comprising a series of fiber washers 37 interspersed with metal washers 38 are pivotally carried on the bolt 34 between the gears and each of the depending ears or sides of the yoke members, the metal washers directly adjacent the gears being of slightly increased diameter so as to be bent outwardly by engagement with the sides of the control shafts as indicated at 40 and 41. The metal washers are of light resilient construction, and due to their distortion, exert a light frictional contact against the control shafts.

A screw threaded collar 42 secured against rotation by an arm 43 which anchors it to the casing 10 is pivotally carried by the bolt 34 adjacent its mid-portion. This collar has screw threaded engagement with a second threaded collar 44 which is mounted for free pivotal movement upon the bolt and carries a depending arm 45. A series of spacer washers 46 may be arranged on the bolt to insure that there will be no lost motion or undue looseness in the friction assemblies, a nut 47 being provided on the end of the bolt member to hold the bolt and the parts in position.

The depending arm 45 of the rotatable collar 44 is secured by means of a link 50 to a locking mechanism provided for moving the arm to any desired position of adjustment and for holding it in such position. While it is to be understood that various suitable forms of locking mechanism may be employed for this purpose, one very desirable form of mechanism, as shown in Fig. 2, comprises an elongated locking sleeve 52 secured at its inner end by connections 53 to the link 50 and provided at its outer end with an operating knob or button 54. The locking sleeve is slidable within a stationary sleeve 55 suitably secured to the housing 10 by means, such as nuts 56. The locking sleeve 52 is released for operation or held in fixed position by means of a release shaft 57 slidable within the sleeve and provided at its inner end with a reversely tapered notch 58 co-operating with a ball member 59, the locking sleeve 52 being provided with an opening through which the ball is adapted to project into engagement with the outer or stationary sleeve 55. The release shaft 57 is provided at its outer end with an operating knob or button 60, a compression spring 61 engageable against the end of locking sleeve 52 being arranged about the release shaft for normally urging the shaft and its operating knob outwardly or to the right as seen in Fig. 2 into locking position.

In the operation of the construction the nut 47 on bolt member 34 is first adjusted or loosened sufficiently so that with the arm 45 and the locking sleeve 52 in the position shown in Fig. 2, there will be substantially no frictional force exerted by the friction assemblies 37, 38 against the sides of gears 35 and 36. With the parts in this position the main control levers 11 and 12 may be readily adjusted to any desired position within their range of travel, resulting in the corresponding adjustment of the wires or rods 14 and 15 which are connected to the devices to be controlled. As the control levers are pivoted about the axis 13, longitudinal motion will be imparted to the control shafts 18 and 19 due to the connecting eye-bolts, and the control shafts will in turn impart rotational motion to the gears 35 and 36 due to the geared connection of these parts; but inasmuch as the gears are at this time freely rotatable upon the bolt 34, there will be no resistance to movement, and the control levers may be readily and easily moved to desired position.

If the locking mechanism is now manipulated so as to move locking sleeve 52 to the right as shown in Fig. 2, corresponding movement will be imparted to the depending arm 45 of the rotatable collar 44. The collar 42 being anchored to the housing 10 and thus prevented from rotation, as the collar 44 is rotated, it will be moved slightly to the left as seen in Fig. 3 with respect to the collar 42 due to the threaded connection between the collars. This relative movement of the two collar members imparts compression to the friction assemblies so as to bring them into tight gripping engagement against the sides of the gear wheels. The relative axial movement of the collars during this operation is small, and the depending ears 30—33 of the yoke members and the arm or bracket 43 are sufficiently resilient to accommodate the necessary adjustment of the parts. In other words, these members are sufficiently resilient so that all four of the friction assemblies will be compressed the same amount resulting in the application of uniform frictional pressure against the side of the gear wheels.

With the gear wheels thus locked against rotational movement, bodily longitudinal movement of the control shafts 18 and 19 is prevented and the main control levers 11 and 12 will be securely locked in the desired adjusted position which they were in at the time the locking sleeve 52 was manipulated. However, micrometer adjustments may be readily imparted in either direction to the control levers by manipulation of the knobs 23 and 24. As these knobs are rotated, the control shafts 18 and 19 will be correspondingly rotated, and inasmuch as the gears are locked against rotation, the rotational movement of the control shafts will cause slight longitudinal adjustment of the shafts due to the threaded connection, the gear wheels, during this operation, serving as a reaction base. It will be seen that micrometer adjustments may be thus readily imparted to the control levers 11 and 12 in any position of adjustment, by manipulation of the knobs 23 and 24. It is to be understood that the control levers are independently pivoted on the axis 13, and that either control shaft may be moved independently of the other.

Due to the distortion, as indicated at 40 and 41, of the metal washers which are directly in contact with the gear wheels, the washers exert a slight frictional contact against the control shafts 18 and 19 sufficient to hold them against rotation which might otherwise result due to vibration or the like. This frictional resistance is not sufficient to in any way impair the ready operation of the control shafts by the knobs 23 and 24, but it is sufficient to retain the control shafts against inadvertent rotation at all times except when a definite manual pressure is applied to the knobs.

The locking sleeve 52 is shown in its extreme release position in Fig. 2, movement inwardly and to the left having been limited by contact between the inner end of knob 54 and the mounting nut 56, as indicated at 65. The movement of the locking sleeve to the right is limited by the engagement of the end 66 of the connections 53 with end 67 of the stationary sleeve 55. In other words, the locking sleeve can be moved only through fixed predetermined limits to apply a definite range of adjustment to the friction assemblies. This range of adjustment is controllable by the nut 47. For example, if it is desired to avoid the positive locking of the control levers 11 and 12 when the locking sleeve 52 is pulled outwardly to its locking or right-hand position, the nut 47 may be loosened slightly to avoid a positive locking of the parts with the locking sleeve in this position, the nut being adjusted to impart only the desired frictional resistance to the parts when in this position whereby to frictionally hold the control levers in position but avoid the positive locking thereof. The sides of the housing 10 are sufficiently resilient to permit this adjustment, the spacer washers 46 being provided to initially properly space the parts.

The locking sleeve 52 may be locked in any position within its range of movement by means of the ball 59 and the notch 58. Normally the compression spring 61 urges the release shaft 57 to the right with respect to the locking sleeve. This causes the reversely tapered notch 58 to thrust the ball 59 downwardly into engagement with the stationary sleeve 55, resulting in a reactionary thrusting of the release shaft upwardly causing the locking sleeve 52 to be frictionally engaged with the stationary sleeve 55 at their engaging surfaces as indicated at 68. The locking sleeve is thus locked in any of its positions of adjustment. To release the locking sleeve the knobs 54 and 60 are compressed together against the action of spring 61. This releases the thrust upon the ball and releases the parts so that the locking sleeve may be readily moved to any position of adjustment, to position the arm 45 in any desired position, and impart any desired intermediate frictional adjustment to the friction assemblies. Upon release of the knobs, the spring 61 immediately operates to securely hold the locking sleeve 52 in adjusted position.

The control mechanism of the present invention is adapted for many uses, and is particularly adapted for use in controlling carburetors or like equipment of automotive vehicles and airplanes. It provides ready means for moving the control handles rapidly and without resistance throughout their range of adjustment. It further provides ready means for locking the control handles in any desired position from which micrometer adjustments may be made. At the same time the micrometer adjustment mechanism is subjected to sufficient frictional resistance so that it will not operate or lose its adjustment even though the control mechanism be subjected to extreme conditions of vibration.

The locking mechanism, including the locking sleeve 52, provides a very satisfactory means for locking the control levers in adjusted position. The locking sleeve may be readily released and adjusted to any desired position, and when so adjusted the compression spring 61 in combination with the ball and slot arrangement, firmly holds the parts in adjusted position.

In Figs. 4 and 5 an embodiment of the invention is illustrated which is substantially similar to that previously described, except that in this instance the arm 45' for locking the control levers in position extends upwardly through slot 70 in the casing 10. The slot may be provided with a shoulder 71 at one end thereof for holding the arm 45' when it is pulled forwardly into locking position. The arm may be so positioned with respect to the slot 70 so that due to its own resiliency it will snap into position against the shoulder 71. To release the arm for movement to unlocking position it is merely necessary to force it slightly to the right, as seen in Fig. 5 as it is moved.

In Fig. 6 there is illustrated a form of the invention which is also similar to that shown in Figs. 1, 2 and 3 except that in this instance the locking sleeve 52' is controllable from a remote point by means of a flexible cable construction 75 and a locking mechanism 76, which may be of the type shown in Fig. 2. In this form of the invention the mechanism 76 situated at a remote point furnishes an over-control from the remote point for controlling the movement of the control levers at the operator's station.

In Figs. 7 and 8 a still further embodiment of the invention is illustrated, particularly adapted for use with devices such as the controls of steam or gas digging shovels or the like. However, the mechanism may be used in various constructions. In this instance a control mechanism embodying a single control handle is illustrated, wherein the gear wheel 35' is secured to a shaft 80 which also has fixed thereon a wheel 81 forming a part of a brake mechanism, the wheel being enclosed within a brake drum 82 provided with a brake lining 83. The brake drum may be operated in any desired manner to apply a braking action to the wheel 81 thus locking the gear in position so as to enable the making of micrometer adjustments in the control mechanism. As shown particularly in Fig. 7, the locking action of the brake drum may be applied by means of a cable 84 passing over a pulley 85 and connected to a foot treadle device 86 normally held in released position by spring 87. With such an arrangement the operator may readily and easily adjust the control handle 11 with his hand to any desired position. The foot treadle may then be operated to lock the control handle in position from which the micrometer adjustments may be made by means of the knob 23 as in the previous embodiments of the invention. By means of this arrangement the device to be controlled which is connected to the rod 14 may be readily brought to the approximate desired position and then accurately positioned by the micrometer control mechanism.

It is obvious that various changes may be made in the embodiments of the invention specifically set forth for purposes of illustration without departing from the spirit of the invention. The invention is accordingly not to be limited to the specific embodiments shown and described, but only as indicated in the following claims.

The invention is hereby claimed as follows:

1. In a control mechanism, a control member movable through a given range of travel, frictional means operable to frictionally hold said member in any position of adjustment within said range of travel, means to effect micrometer movements of said member while so held in position, means including a manually operable control handle, shiftable to determine the degree of frictional holding effectiveness of said holding means, and selectively releasable means for locking the shiftable means in any position within its range of movement.

2. In a control mechanism, a control member movable through a given range of travel, a control shaft secured thereto, said control shaft having a threaded portion, a gear wheel in engagement with said threaded portion, means for applying frictional resistance to rotation of said gear wheel whereby to hold said control shaft in position, means for rotating said control shaft to effect micrometer adjustments thereof, and means having pressure engagement with a section of the control shaft for applying frictional resistance to rotation thereof.

3. In a control mechanism, a control member movable through a given range of travel, holding means operable to apply varying frictional pressures to hold said member in any position of adjustment within said range of travel, means to effect micrometer movements of said member while so held in position, means for adjusting the frictional effectiveness of said holding means, said adjusting means comprising a manual control member shiftable to progressively vary said adjusting means and comprising selectively releasable means for holding said manual control member selectively in any adjusted shiftable position.

4. In a control mechanism, a control member movable through a given range of travel, a control shaft secured thereto, said control shaft having a screw threaded portion, a gear wheel in engagement with said screw threaded portion, means for holding said gear wheel against movement to thereby hold the control member in any position within said range of travel, said control shaft being rotatable to effect micrometer movements of the control member while so held in position, and a pair of yieldable washer members mounted on either side of the gear wheel and frictionally engageable with the sides of the control shaft for frictionally resisting rotation thereof.

5. In a control mechanism, a control member movable through a given range of travel, frictional means operable to hold said member in any position of adjustment within said range of travel, means to effect micrometer movements of said member while so held in position, means for adjusting the degree of frictional holding force exerted by said holding means, said adjusting means comprising adjustable force applying means including action and reaction elements operable on said frictional means to apply holding pressures substantially throughout the full available range of frictional holding forces, and a second force applying means cooperating with said first mentioned force applying means and controllable independently of the first force applying means to exert holding pressure on said frictional means throughout a relatively limited range of adjustment whereby said second force applying means is operable within a given range while the first force applying means determines the limits of the range.

6. A control mechanism as defined in claim 5, wherein said second force applying means comprises a manual control handle shiftable through a predetermined range of travel.

7. In a control mechanism, a plurality of individually operable control members, each of said members being movable through a given range of travel, a control shaft secured to each of the control members, each of said control shafts having a threaded portion, a gear wheel in engagement with the threaded portion of each of said control shafts, means for holding said gear wheels against movement to thereby hold the control members in adjusted position, said holding means comprising a friction device engageable with each of said gear wheels, a pair of cooperating screw threaded members relatively axially movable to apply pressure to said friction device, and a manual control handle operatively connected to said screw threaded members to effect relative axial movement thereof against said frictional means.

8. A control mechanism as defined in claim 7, wherein said screw threaded members are located between the gear wheels and act outwardly to apply pressure to the friction device and wherein a second adjustable force applying means acts adjacent the outer sides of the gear wheels to determine the limits of the range of force applied by said screw threaded members.

9. In a control mechanism, a control member movable through a given range of travel, a control shaft secured to said control member, said control shaft having a threaded portion, a gear wheel in engagement with said threaded portion, and a friction device engageable with the gear wheel for resisting rotation thereof whereby to hold said control shaft in position, means for rotating said control shaft to effect micrometer adjustments thereof, and said friction device having a portion frictionally engageable with said control shaft for resisting rotation of the shaft.

10. In a control mechanism, a control member movable through a given range of travel, a control shaft connected to said control member, said control shaft having a threaded portion, a gear wheel in engagement with said threaded portion, means for holding said gear wheel against movement, said holding means comprising a friction device engageable with the gear wheel, adjustment means comprising a pair of adjustment members relatively movable to apply pressure to said friction device, and means for effecting relative movement of said adjustment members comprising a manually shiftable means operatively connected to said adjustment means, and stop means for limiting the movement of said manually shiftable means in opposite directions of travel whereby to limit the movement of said manually shiftable means and thereby control the range of adjustment imparted to said adjustment members.

CHARLES A. ARENS.